(12) United States Patent
Xu et al.

(10) Patent No.: US 11,148,069 B2
(45) Date of Patent: Oct. 19, 2021

(54) MULTIPLE DOWNCOMER TRAYS

(71) Applicant: UOP LLC, Des Plaines, IL (US)

(72) Inventors: Zhanping Xu, Inverness, IL (US); Rebecca Mudrock, Wauconda, IL (US)

(73) Assignee: UOP LLC, Des Plaines, IL (US)

( * ) Notice: Subject to any disclaimer, the term of this patent is extended or adjusted under 35 U.S.C. 154(b) by 49 days.

(21) Appl. No.: 16/707,029

(22) Filed: Dec. 9, 2019

(65) Prior Publication Data

US 2021/0170300 A1  Jun. 10, 2021

(51) Int. Cl.
*B01D 3/20* (2006.01)
*B01D 3/32* (2006.01)
B01D 3/16 (2006.01)
B01D 3/22 (2006.01)
B01D 3/00 (2006.01)

(52) U.S. Cl.
CPC .............. *B01D 3/20* (2013.01); *B01D 3/324* (2013.01); *B01D 3/008* (2013.01); *B01D 3/163* (2013.01); *B01D 3/225* (2013.01); *B01J 2208/00548* (2013.01)

(58) Field of Classification Search
CPC .......... B01D 3/20; B01D 3/324; B01D 3/008; B01D 3/163; B01D 3/225; B01J 2208/00548
USPC ............................................ 261/114.1, 114.5
See application file for complete search history.

(56) References Cited

U.S. PATENT DOCUMENTS

| | | |
|---|---|---|
| 3,632,315 A | 1/1972 | Uitti |
| 3,700,216 A | 10/1972 | Uitti et al. |
| 4,550,000 A * | 10/1985 | Bentham .................. B01J 19/32 261/114.1 |
| 4,956,127 A | 9/1990 | Binkley et al. |
| 5,098,615 A | 3/1992 | Resetarits |
| 5,106,556 A | 4/1992 | Binkley et al. |
| 5,164,125 A | 11/1992 | Binkley et al. |
| 5,192,466 A | 3/1993 | Binkley |
| 5,262,094 A | 11/1993 | Chuang |
| 5,277,848 A | 1/1994 | Binkley et al. |
| 5,382,390 A | 1/1995 | Resetarits et al. |
| 5,407,605 A | 4/1995 | Resetarits et al. |
| 5,480,595 A | 1/1996 | Yeoman et al. |
| 5,547,617 A | 8/1996 | Lee et al. |
| 6,189,872 B1 | 2/2001 | Chuang |
| 6,736,378 B2 * | 5/2004 | Colic ....................... B01D 3/20 261/114.1 |
| 6,799,752 B2 | 10/2004 | Wu et al. |
| 8,136,799 B2 | 3/2012 | Griepsma |

(Continued)

FOREIGN PATENT DOCUMENTS

WO  02102488 A1  12/2002

OTHER PUBLICATIONS

International Search Report and Written Opinion from PCT application No. PCT/US2020/063878 dated Mar. 4, 2021.

*Primary Examiner* — Charles S Bushey

(57) ABSTRACT

Multiple downcomer trays having increased active area for vapor-liquid contact and separation are described. The increased active area of the tray is achieved by adding raised bubble promoters surrounded by perforated vertical contactors on the tray deck. The bubble promoters and surrounding vertical contactors are located under the downcomers from the tray above. The bubble promoter and surrounding vertical contactor promote uniform fluid flow and contact.

20 Claims, 6 Drawing Sheets

(56) References Cited

U.S. PATENT DOCUMENTS

| | | | |
|---|---|---|---|
| 8,833,742 B2 * | 9/2014 | Xu | B01D 3/324 261/114.1 |
| 2007/0137482 A1 | 6/2007 | Xu et al. | |

* cited by examiner

MULTIPLE DOWNCOMER TRAYS

BACKGROUND

Multiple downcomer trays are widely used in distillation columns for the separation of light hydrocarbons, such as propane-propylene and ethane-ethylene, due to their high capacity and ease of scale-up.

FIGS. 1A-1B show an existing design of a multiple downcomer tray 100. It is composed of deck 105 and terminated downcomers 110. The deck 105 has perforations 115. FIG. 1B illustrates two trays 100 and 125. Downcomers 110 extend across the column cross section and are supported by ring 145. The top of downcomer 110 is open for receiving liquid from deck 105 and the bottom of the downcomer 110 has openings for discharging liquid to a lower tray 125. The ring 145 is attached to column wall 150. The deck 105 is supported by the downcomers 110 and the ring 145. The downcomers 135 for tray 125 are offset by 90 degrees from the downcomers 110 of tray 100. There are anti-jumping baffles 120 above the downcomers 110 for tray 100 (not shown in FIG. 1A). Tray 125 has a deck 130 with downcomer 135 and anti jumping baffles 140.

The active area for vapor-liquid contacting on tray 100 is approximately 70-90% of the column cross-sectional area. The rest of the column cross-sectional area is blocked by the downcomers 110, tray support ring 145 and deck supports on the sides of downcomers (not shown). In addition, those tray zones for receiving liquid on lower tray 125 under the downcomers 110 for the upper tray 100 are not as active as those tray zones away from the downcomers 110 due to higher liquid head there and less vapor to pass through.

The current multiple downcomer trays have a number of advantages. The long downcomer weir length provides the ability to handle high liquid loads. The 90-degree rotation of the downcomers between adjacent trays permits the use of trays in large columns without large-scale mal-distribution of liquid. The terminated downcomers provide large free space for vapor-liquid flow, contact and separation.

However, it would be desirable to have a tray with a higher capacity than existing multiple downcomer trays to increase throughput in existing columns.

DESCRIPTION

Figure 1A:
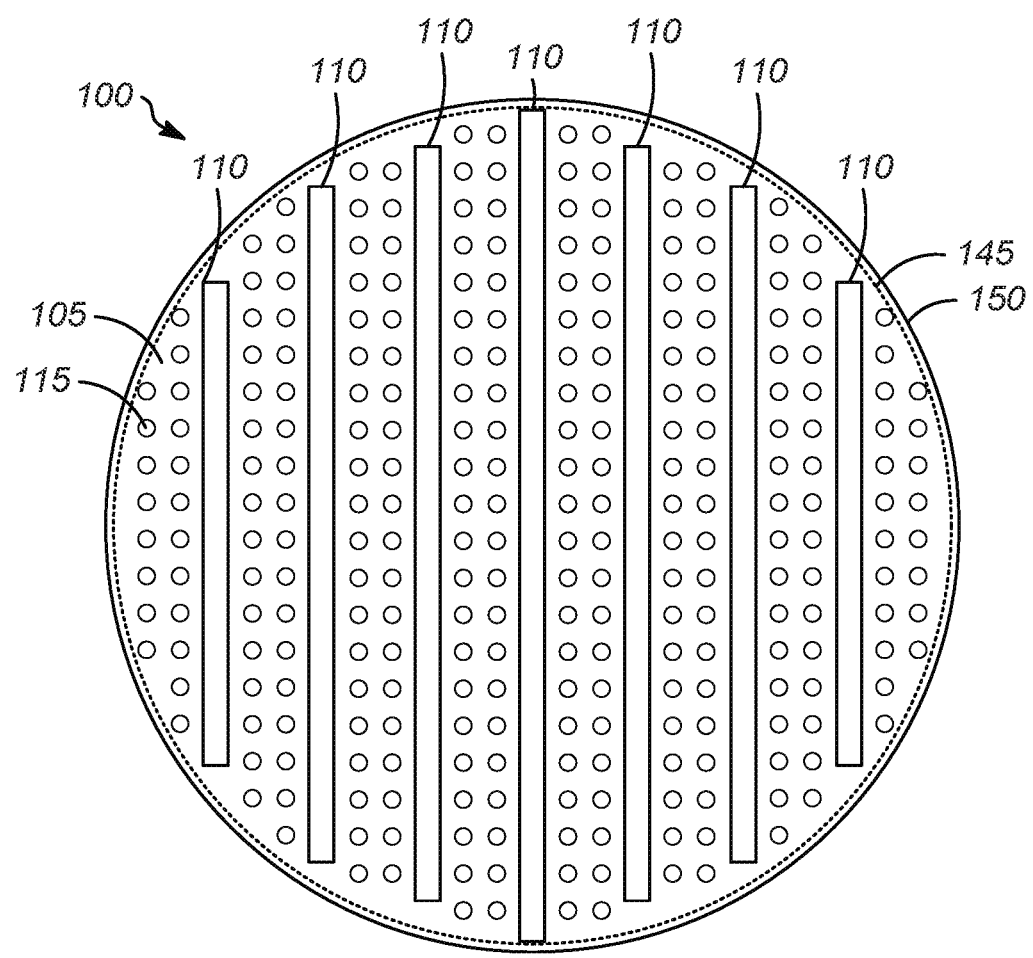
FIGS. 1A and 1B illustrate an existing design for a multiple downcomer tray.
Figure 1B:
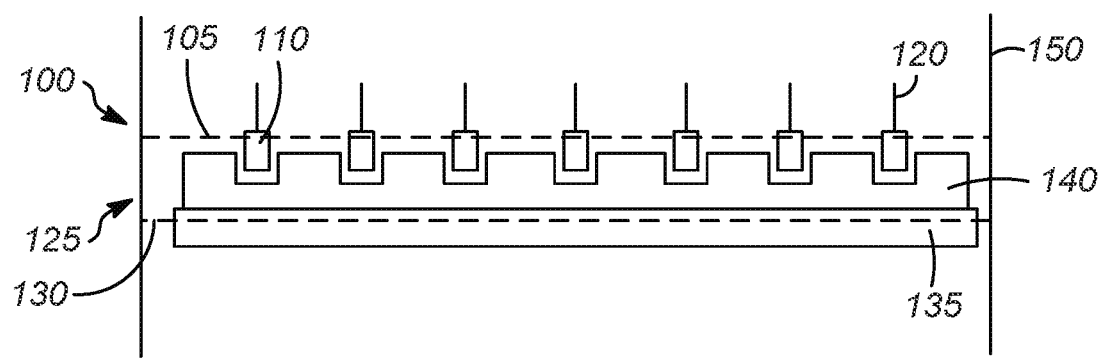

The capacity of the current multiple downcomer tray has been increased by expanding the tray active area for vapor-liquid flow, contact, and separation. The increased active area of the tray is achieved by adding raised bubble promoters surrounded by perforated vertical contactors on the tray deck which are located under the downcomers from the tray above. With the raised bubble promoters and surrounding vertical contactors, the tray active area can be increased by about 10% to 30%. In addition, the zones under the downcomer from the tray above become more active due to reduced liquid head there.

Adding the bubble promoter and surrounding vertical contactor on the tray deck also increases the efficiency of the tray. The bubble promoter and surrounding vertical contactor promote uniform vapor and liquid flow and contact across the deck.

In some embodiments, the downcomers have straight, parallel sides. In other embodiments, the downcomer body below the deck can be sloped to minimize the downcomer volume and increase space for vapor-liquid flow, contact, and separation.

With these improvements, the tray active area for vapor-liquid contacting and separation can be increased to more than 100% of the column cross-sectional area.

The bubble promoters can have a variety of shapes, including, but not limited to, an inverted V-shape with vertical ends, an inverted V-shape with at least one inclined end, a pyramid shape, or combinations thereof. The inverted V-shape with at least one inclined end and the pyramid shape allows liquid to flow in more than two directions to the surrounding deck.

One aspect of the invention is a tray. In one embodiment, the tray comprises: a perforated deck; a plurality of parallel trough-like downcomers extending through the deck, each downcomer having a plurality of spout zones at a bottom; a plurality of perforated bubble promoters on the deck, each bubble promoter defining an area on the deck, the bubble promoters positioned to align with a plurality of spout zones on a plurality of parallel trough-like downcomers on an adjacent tray rotated 90 degrees from the downcomers on the tray; and a plurality of vertical contactors, each vertical contactor having two opposing perforated side walls, two opposing end walls configured to receive sides of a downcomer from a tray above, an open bottom configured to enclose the bubble promoter, and a top configured to receive the downcomer from the tray above.

In some embodiments, the defined area on the deck has an opening.

In some embodiments, the defined area on the deck comprises a perforated plate.

In some embodiments, the defined area on the deck comprises a hole.

In some embodiments, the total open area of one of the defined areas is greater than or equal to 100% of a total open area of the bubble promoter for the one defined area.

In some embodiments, the total open area of one of the defined areas is greater than or equal to 120% of a total open area of the bubble promoter for the one defined area.

In some embodiments, the size of the perforations of the deck is different from a size of the perforations of the bubble promoters.

In some embodiments, the pitch of the perforations of the deck is different from a pitch of the perforations of the bubble promoters.

In some embodiments, the bubble promoters have an inverted V-shape with vertical ends, an inverted V-shape with at least one inclined end, a pyramid shape, or combinations thereof.

In some embodiments, the downcomers have sloped sides.

In some embodiments, the open area in the side walls of the vertical contactors is in a range of 15 to 40% of a total area of the side walls.

In some embodiments, the open area of the deck is in a range of 10 to 30% of a total area of the deck, or the open area of one of the bubble promoters is in a range of 10 to 30% of a total area of the one bubble promoter, or both.

In some embodiments, the length of the spout zones on the first tray is less than a length of the bubble promoters on the tray below, or the width of the spout zones on the first tray is less than a width of the bubble promoters on the tray below, or both.

Another aspect of the invention is a mass transfer column. In one embodiment, the mass transfer column comprises: at least two trays vertically spaced apart, each tray comprising: a perforated deck; a plurality of trough-like downcomers extending through the deck, each downcomer having a plurality of spout zones at a bottom; a plurality of perforated bubble promoters on the deck, each bubble promoter defining an area on the deck, the bubble promoters on the tray below positioned to align with a plurality of spout zones on the first tray, wherein the downcomer on a first tray is terminated above a top of the bubble promoter on the tray below, wherein the downcomers on the first tray are rotated 90 degrees from the downcomers on the tray below; and a plurality of vertical contactors, each vertical contactor having two opposing perforated side walls, two opposing end walls configured to receive sides of the downcomer from the first tray, an open bottom configured to enclose the bubble promoter, and a top configured to receive the downcomer from the tray above.

In some embodiments, the length of the spout zones on the first tray are the same as a length of the bubble promoters on the tray below, or a width of the spout zones on the first tray is the same as a width of the bubble promoters on the tray below, or both.

In some embodiments, the bubble promoters have an inverted V-shape with vertical ends, an inverted V-shape with at least one inclined end, a pyramid shape, or combinations thereof.

In some embodiments, the bubble promoters have the inverted V-shape with at least one inclined end, and the inclined end is perforated.

In some embodiments, the downcomers on the first tray have sloped sides.

In some embodiments, at least one of the following is present: the total open area of one of the defined areas of the first tray is greater than or equal to 100% of a total open area of the bubble promoter for the one defined area on the first tray; or the open area of the deck of the first tray is in a range of 10 to 30% of a total area of the deck; or an open area of the bubble promoters of the first tray is in a range of 10 to 30% of a total area of the bubble promoters.

In some embodiments, the size of the perforations of the deck is different from a size of the perforations of the bubble promoters, or wherein a pitch of the perforations of the deck is different from a pitch of the perforations of the bubble promoters, or both.

Figure 2A:
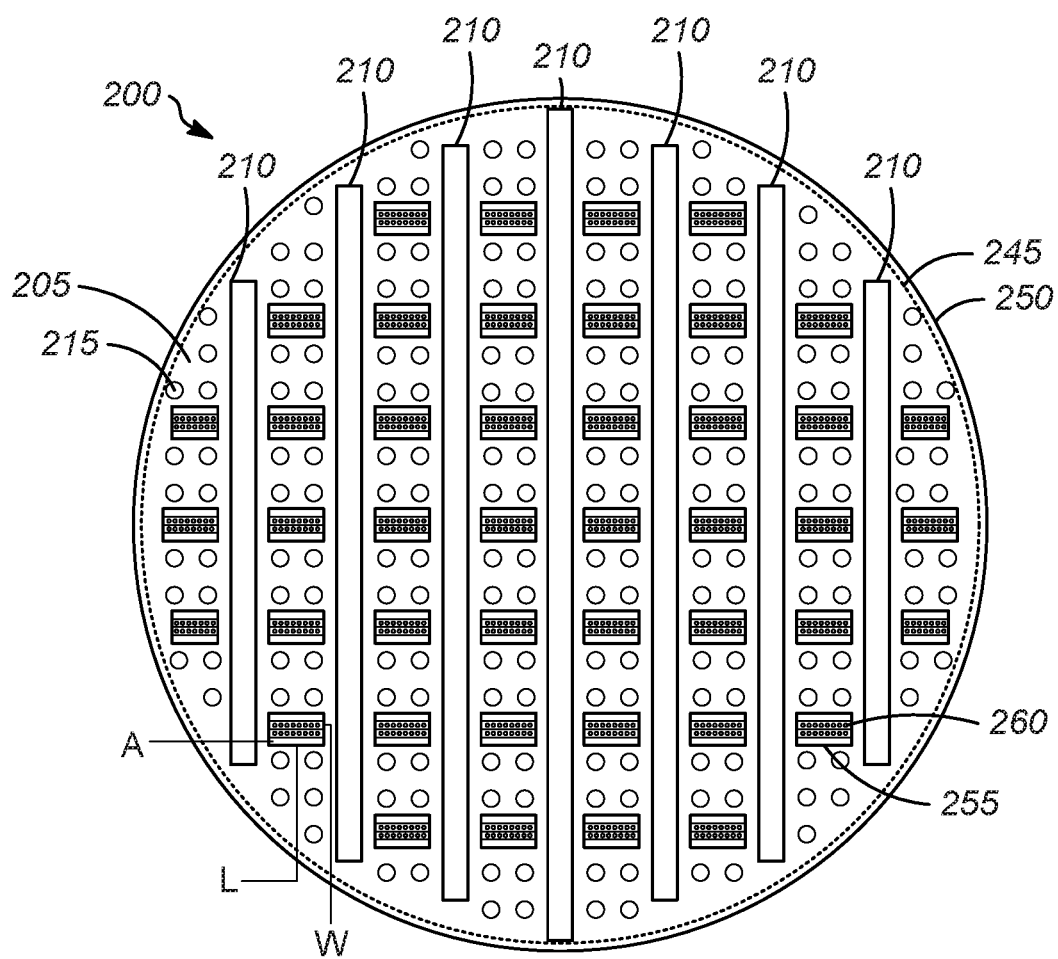
FIGS. 2A and 2B illustrate one embodiment of the multiple downcomer tray of the present invention.
Figure 2B:
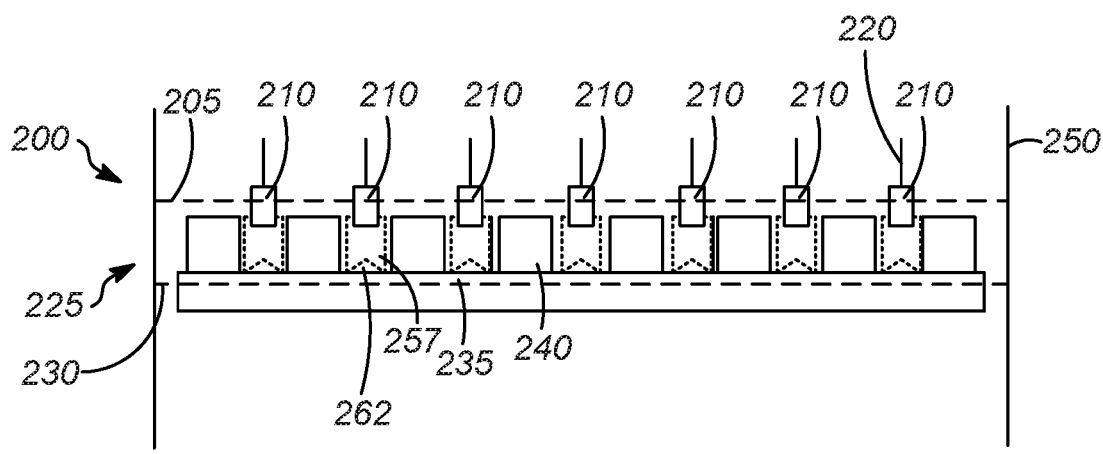

FIGS. 2A-2B show one embodiment of the multiple downcomer tray 200 of the present invention. It is composed of deck 205 and terminated downcomers 210. The deck 205 has perforations 215. There is an array of vertical contactors 255 surrounding bubble promoters 260 on the deck 205 (discussed in more detail below) which are aligned with the downcomers of the tray above (not shown for tray 200 in FIG. 2B). Downcomers 210 extend across the column cross section and are supported on ring 245. The ring 245 is attached to column wall 250. There are anti jumping baffles 220 above the downcomers 210 for tray 200 (not shown in FIG. 2A). Tray 225 has a perforated deck 230 with downcomers 235 and anti jumping baffles 240. Part of the anti jumping baffle 240 was not shown for clarity. The downcomers 235 for tray 225 are offset by 90 degrees from the downcomers 210 of tray 200. There are vertical contactors 257 and bubble promoters 262 on the deck 230.

Figure 3A:
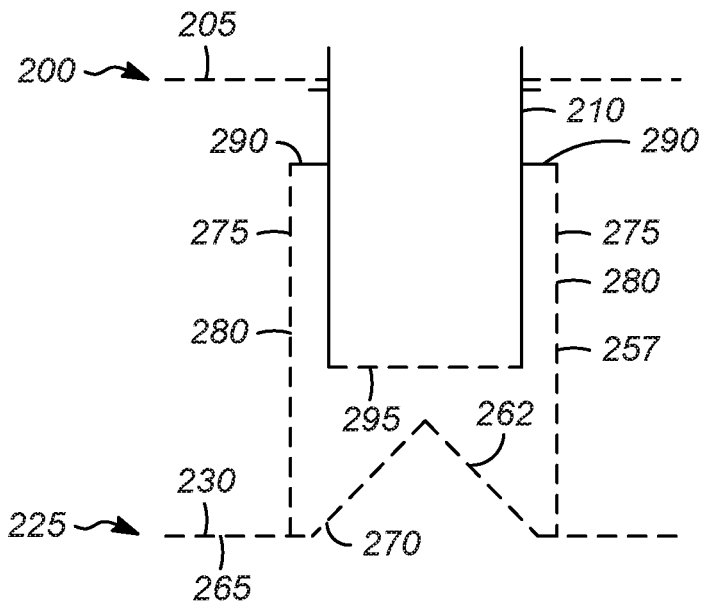
FIGS. 3A and 3B illustrate embodiments of the relationship between the downcomer of one tray and the vertical contactor and bubble promoter of the adjacent tray.
Figure 4A:
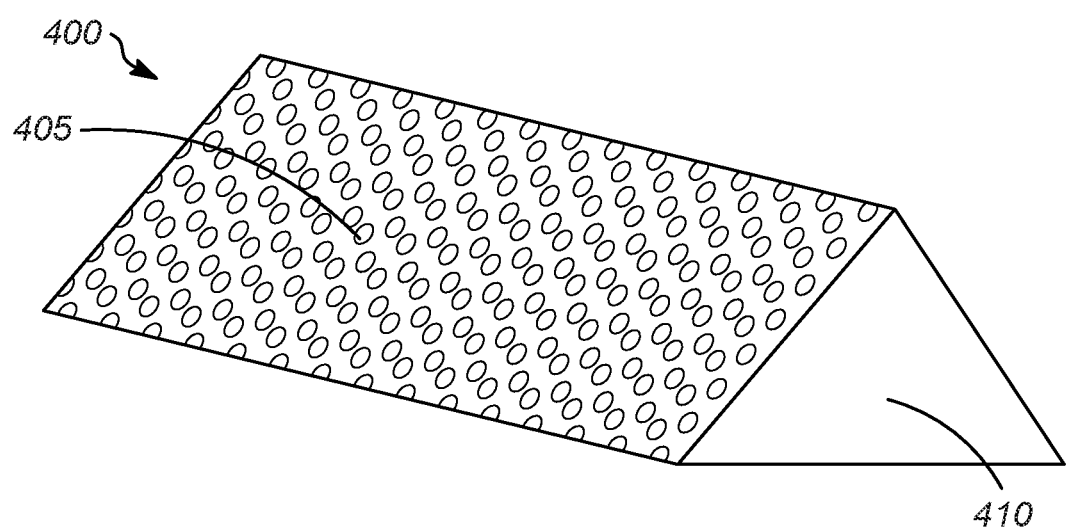
FIGS. 4A, 4B, and 4C illustrate embodiments of the bubble promoter of the present invention.
Figure 4B:
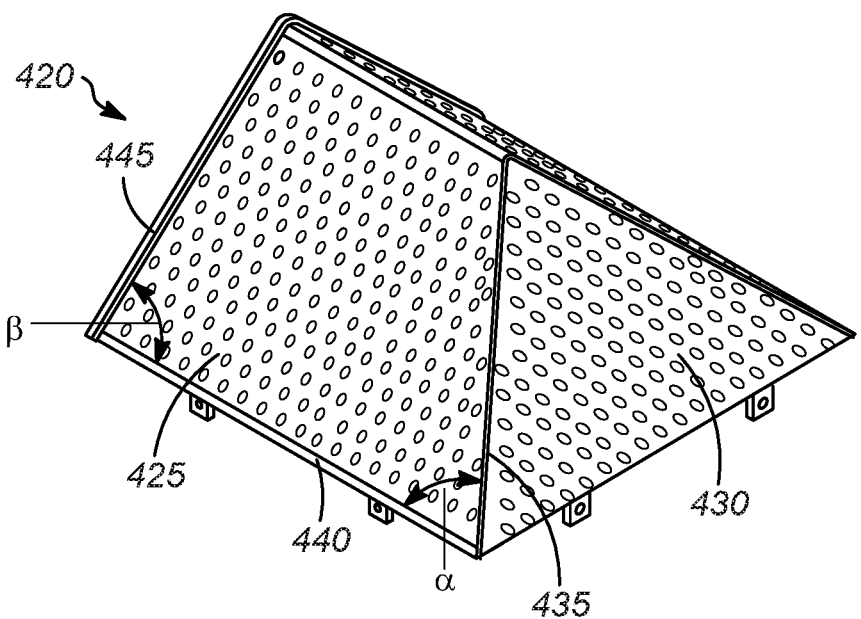
Figure 4C:
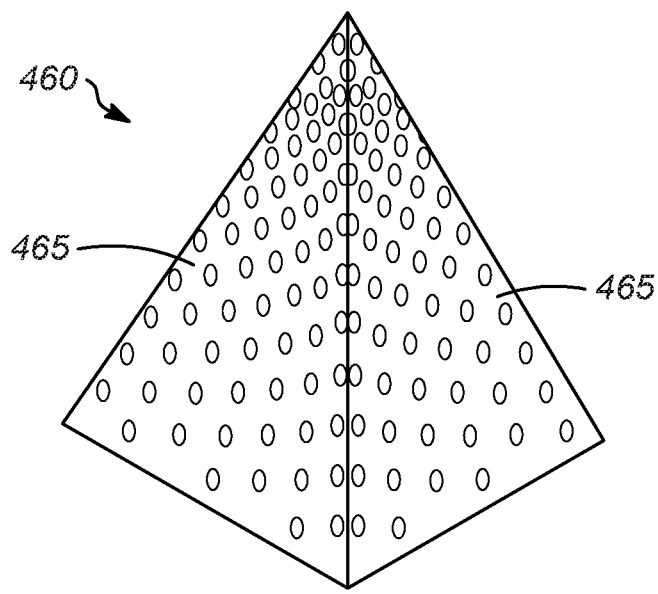
Figure 5:
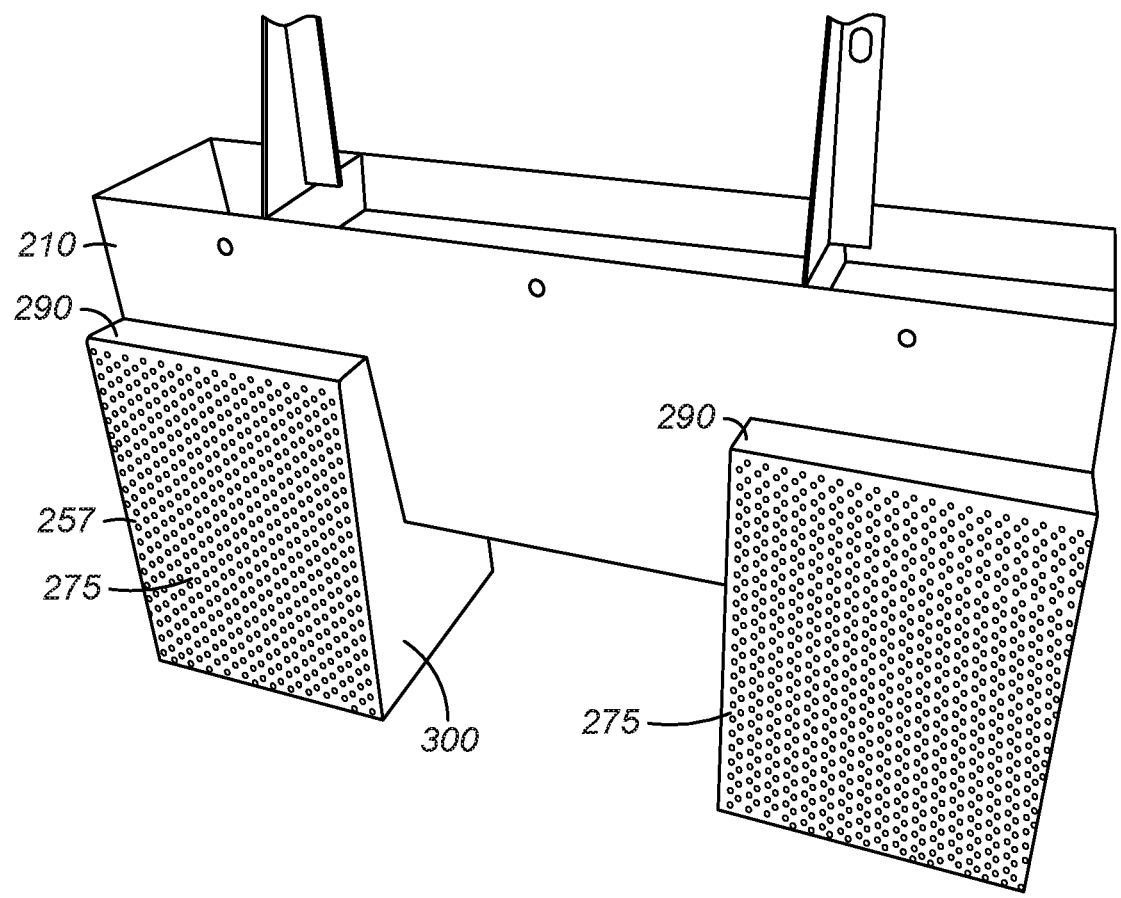
FIG. 5 illustrates one embodiment of the vertical contactor of one tray with the downcomer of the adjacent tray.

The vertical contactors 257 and bubble promoters 262 are shown in more detail in FIGS. 3-5. FIG. 3A illustrates one embodiment of a portion of multiple downcomer trays 200 and 225. There is a downcomer 210 extending across the column cross section through deck 205 of tray 200. In this embodiment, the sides of the downcomer 210 are vertical.

The deck 230 of tray 225 has perforations 265. There is a bubble promoter 262 which has perforations 270. As shown in FIG. 3A, the bubble promoter 262 has an inverted V-shape.

The vertical contactor 257 surrounds the bubble promoter 262, as shown in FIG. 3A. The vertical contactor 257 has two opposing side walls 275 with perforations 280. The opposing end walls (not shown) are typically solid, although they could be perforated, if desired. The top 290 of the vertical contactor 257 is configured to receive the downcomer 210 such that majority of the liquid and vapor out of the bubble promoter 262 pass through the two opposing perforated side walls 275. The bottom 295 of downcomer 210 is partially open to allow liquid to flow down onto bubble promoter 262.

Figure 3B:
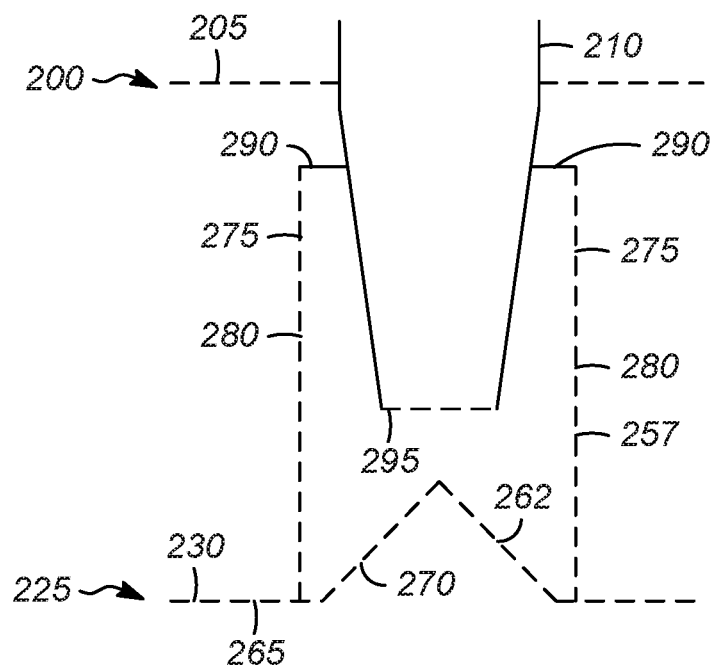

FIG. 3B illustrates another embodiment of a portion of the multiple downcomer trays 200 and 225. In this embodiment, the sides of the downcomer 210 below deck 205 are sloped. The sloped sides can be either straight (as shown) or the sides can be curved.

As shown in FIGS. 3A and 3B, the side walls 275 of the vertical contactor 257 are vertical and straight, but they can also be curved or sloped (either straight or curved). When the bubble promoters 262 are significantly wider than the downcomers 210, the side walls 275 of the vertical contactor 257 can be sloped such that the width of the vertical contactor 257 at bottom is wider than that at top for enclosing the bubble promoter 262 and part of the downcomer 210.

FIGS. 4A, 4B, and 4C illustrate different embodiments of the bubble promoter. FIG. 4A shows a bubble promoter 400 with perforated, sloped sides 405 and non-perforated vertical ends 410 forming an inverted V-shape (i.e., a tent shape). The two opposite non-perforated vertical ends 410 are parallel for most of the bubble promoters in middle of the tray but can be non-parallel for some of those adjacent to column wall 250. FIG. 4B shows a bubble promoter 420 with perforated trapezoidal sides 425 and at least one perforated end 430. Side 435 of the trapezoidal side 425 forms an acute angle $\alpha$ with the base 440. The opposite side 445 of the trapezoidal side 425 forms an angle $\beta$ with the base 440. The angle $\beta$ can be the same as or different than the angle $\alpha$ depending on the location of the bubble promoter. The trapezoidal sides 425 form an inverted V-shape, and one or both ends 430 are inclined. The inclined end(s) 430 are perforated. FIG. 4C shows a bubble promoter 460 with four triangular sides 465 forming a pyramid shape. Other shapes could also be used.

Returning to FIGS. 2A-2B, each bubble promoter 260 defines an area A (the length L and width W of the bubble promoter 260) on the deck 205 underneath the bubble promoter 260. The defined area A on the deck 205 has an opening. The opening can be a single hole or plurality of holes. In some embodiments, the total open area of the defined area A is greater than or equal to 100% of the total open area of the bubble promoter for that defined area. Preferably, the total open area of the defined area A is greater than or equal to 120% of the total open area of the bubble promoter for that defined area.

The perforations 215 in the deck 205, the perforations 270 in the bubble promoter 262, and the perforations 280 in the side walls 275 of the vertical contactor 257 can have the same size or different sizes, the same shape or different shapes, and the same pitch (number of perforations/area) or different pitches.

FIG. 5 illustrates how the vertical contactors 257 from one tray (not shown) are configured to receive the downcomer 210 from the tray above (not shown). Each vertical contactor 257 surrounds a bubble promoter (not shown), a spout zone at downcomer bottom, and part of the downcomer body. The vertical contactors 257 have opposing perforated side walls 275 and opposing end walls 300. The top 290 and the end walls 300 of the vertical contactors 257 are configured to accommodate the downcomer 210.

Each of the spout zones at downcomer bottom contains a plurality of holes or slots. The length L and width W of the defined area A on deck 205 by the bubble promoter 260 is at least as large as the spout zone in a downcomer above so that all the liquid out of the spout zone falls onto the bubble promoter 260. The spout zone has a width similar to that of downcomer bottom 295 and a length less than the net spacing between two adjacent downcomers 210. The bottom of the vertical contactors 255 is slightly larger than the area A (e.g., about 25 mm longer than L and wider than W) so that the bubble promoter 260 is enclosed by the vertical contactors 255. Vapor flows up through the perforations on the bubble promoter 260. The falling liquid from the spout zone at downcomer bottom 295 contacts with vapor above the bubble promoter, and at the same time is pushed by the upflow vapor and the sloped sides of the bubble promoter 260 toward the perforated side walls 275 of the vertical contactor 255. The liquid exiting the vertical contactor 255 falls on the deck 230 surrounding the vertical contactor 255 for further contacting with the vapor up through the perforations on the deck 230. The vapor exiting the vertical contactor 255 flows up to the next tray.

Specific Embodiments

While the following is described in conjunction with specific embodiments, it will be understood that this description is intended to illustrate and not limit the scope of the preceding description and the appended claims.

A first embodiment of the invention is a tray comprising a perforated deck; a plurality of parallel trough-like downcomers extending through the deck, each downcomer having a plurality of spout zones at a bottom; a plurality of perforated bubble promoters on the deck, each bubble promoter defining an area on the deck, the bubble promoters positioned to align with a plurality of spout zones on a plurality of parallel trough-like downcomers on an adjacent tray rotated 90 degrees from the downcomers on the tray; and a plurality of vertical contactors, each vertical contactor having two opposing perforated side walls, two opposing end walls configured to receive sides of a downcomer from a tray above, an open bottom configured to enclose the bubble promoter, and a top configured to receive the downcomer from the tray above. An embodiment of the invention is one, any or all of prior embodiments in this paragraph up through the first embodiment in this paragraph wherein the defined area on the deck has an opening. An embodiment of the invention is one, any or all of prior embodiments in this paragraph up through the first embodiment in this paragraph wherein the defined area on the deck comprises a perforated plate. An embodiment of the invention is one, any or all of prior embodiments in this paragraph up through the first embodiment in this paragraph wherein the defined area on the deck comprises a hole. An embodiment of the invention is one, any or all of prior embodiments in this paragraph up through the first embodiment in this paragraph wherein a total open area of one of the defined areas is greater than or equal to 100% of a total open area of the bubble promoter for the one defined area. An embodiment of the invention is one, any or all of prior embodiments in this paragraph up through the first embodiment in this paragraph wherein a total open area of one of the defined areas is greater than or equal to 120% of a total open area of the bubble promoter for the one defined area. An embodiment of the invention is one, any or all of prior embodiments in this paragraph up through the first embodiment in this paragraph wherein a size of the perforations of the deck is different from a size of the perforations of the bubble promoters. An embodiment of the invention is one, any or all of prior embodiments in this paragraph up through the first embodiment in this paragraph wherein a pitch of the perforations of the deck is different from a pitch of the perforations of the bubble promoters. An embodiment of the invention is one, any or all of prior embodiments in this paragraph up through the first embodiment in this paragraph wherein the bubble promoters have an inverted V-shape with vertical ends, an inverted V-shape with at least one inclined end, a pyramid shape, or combinations thereof. An embodiment of the invention is one, any or all of prior embodiments in this paragraph up through the first embodiment in this paragraph wherein the downcomers have sloped sides. An embodiment of the invention is one, any or all of prior embodiments in this paragraph up through the first embodiment in this paragraph wherein an open area in the side walls of the vertical contactors is in a range of 15 to 40% of a total area of the side walls. An embodiment of the invention is one, any or all of prior embodiments in this paragraph up through the first embodiment in this paragraph wherein an open area of the deck is in a range of 10 to 30% of a total area of the deck, or wherein an open area of one of the bubble promoters is in a range of 10 to 30% of a total area of the one bubble promoter, or both. An embodiment of the invention is one, any or all of prior embodiments in this paragraph up through the first embodiment in this paragraph wherein a length of the spout zones on the first tray is less than a length of the bubble promoters on the tray below, or a width of the spout zones on the first tray is less than a width of the bubble promoters on the tray below, or both.

A second embodiment of the invention is a mass transfer column comprising at least two trays vertically spaced apart, each tray comprising a perforated deck; a plurality of trough-like downcomers extending through the deck each downcomer having a spout zones at a bottom; a plurality of perforated bubble promoters on the deck, each bubble promoter defining an area on the deck, the bubble promoters on the tray below positioned to align with a plurality of spout zones on the first tray, wherein the downcomer on a first tray is terminated above a top of the bubble promoter on the tray below, wherein the downcomers on the first tray are rotated 90 degrees from the downcomers on the tray below; and a plurality of vertical contactors, each vertical contactor having two opposing perforated side walls, two opposing end walls configured to receive sides of the downcomer from the first tray, an open bottom configured to enclose the bubble promoter, and a top configured to receive the downcomer from the tray above. An embodiment of the invention is one, any or all of prior embodiments in this paragraph up through the second embodiment in this paragraph wherein a length of the spout zones on the first tray are the same as a length of the bubble promoters on the tray below, or a width of the spout zones on the first tray is the same as a width of the bubble promoters on the tray below, or both. An embodiment of the invention is one, any or all of prior embodiments in this paragraph up through the second embodiment in this paragraph wherein the bubble promoters have an inverted V-shape with vertical ends, an inverted V-shape with at least one inclined end, a pyramid shape, or combinations thereof. An embodiment of the invention is one, any or all of prior embodiments in this paragraph up through the second embodiment in this paragraph wherein the bubble promoters have the inverted V-shape with at least one inclined end, and wherein the inclined end is perforated. An embodiment of the invention is one, any or all of prior embodiments in this paragraph up through the second embodiment in this paragraph wherein the downcomers on the first tray have sloped sides. An embodiment of the invention is one, any or all of prior embodiments in this paragraph up through the second embodiment in this paragraph wherein at least one of: a total open area of one of the defined areas of the first tray is greater than or equal to 100% of a total open area of the bubble promoter for the one defined area on the first tray; or an open area of the deck of the first tray is in a range of 10 to 30% of a total area of the deck; or an open area of the bubble promoters of the first tray is in a range of 10 to 30% of a total area of the bubble promoters. An embodiment of the invention is one, any or all of prior embodiments in this paragraph up through the second embodiment in this paragraph wherein a size of the perforations of the deck is different from a size of the perforations of the bubble promoters, or wherein a pitch of the perforations of the deck is different from a pitch of the perforations of the bubble promoters, or both.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A tray comprising:
   a perforated deck;
   a plurality of parallel trough-shaped downcomers extending through the deck, each downcomer having a plurality of spout zones at a bottom;
   a plurality of perforated bubble promoters on the deck, each bubble promoter defining an area on the deck, the bubble promoters positioned to align with a plurality of spout zones on a plurality of parallel trough-shaped downcomers on an adjacent tray rotated 90 degrees from the downcomers on the tray; and
   a plurality of vertical contactors, each vertical contactor having two opposing perforated side walls, two opposing end walls configured to receive sides of a downcomer from a tray above, an open bottom configured to enclose the bubble promoter, and a top configured to receive the downcomer from the tray above.

2. The tray of claim 1 wherein the defined area on the deck has an opening.

3. The tray of claim 1 wherein the defined area on the deck comprises a perforated plate.

4. The tray of claim 1 wherein the defined area on the deck comprises a hole.

5. The tray of claim 1 wherein a total open area of one of the defined areas is greater than or equal to 100% of a total open area of the bubble promoter for the one defined area.

6. The tray of claim 1 wherein a total open area of one of the defined areas is greater than or equal to 120% of a total open area of the bubble promoter for the one defined area.

7. The tray of claim 1 wherein a size of the perforations of the deck is different from a size of the perforations of the bubble promoters.

8. The tray of claim 1 wherein a pitch of the perforations of the deck is different from a pitch of the perforations of the bubble promoters.

9. The tray of claim 1 wherein the bubble promoters have an inverted V-shape with vertical ends, an inverted V-shape with at least one inclined end, a pyramid shape, or combinations thereof.

10. The tray of claim 1 wherein the downcomers have sloped sides.

11. The tray of claim 1 wherein an open area in the side walls of the vertical contactors is in a range of 15 to 40% of a total area of the side walls.

12. The of tray of claim 1 wherein an open area of the deck is in a range of 10 to 30% of a total area of the deck, or wherein an open area of one of the bubble promoters is in a range of 10 to 30% of a total area of the one bubble promoter, or both.

13. The column of claim 1 wherein a length of the spout zones on a first tray is less than a length of the bubble promoters on a tray below, or a width of the spout zones on the first tray is less than a width of the bubble promoters on the tray below, or both.

14. A mass transfer column comprising:
   at least two trays vertically spaced apart, each tray comprising:
      a perforated deck;
      a plurality of trough-shaped downcomers extending through the deck each downcomer having a plurality of spout zones at a bottom;
      a plurality of perforated bubble promoters on the deck, each bubble promoter defining an area on the deck, the bubble promoters on the tray below positioned to align with a plurality of spout zones on a first tray, wherein the downcomer on the first tray is terminated above a top of the bubble promoter on the tray below, wherein the downcomers on the first tray are rotated 90 degrees from the downcomers on the tray below; and
      a plurality of vertical contactors, each vertical contactor having two opposing perforated side walls, two opposing end walls configured to receive sides of the downcomer from the first tray, an open bottom configured to enclose the bubble promoter, and a top configured to receive the downcomer from the tray above.

15. The column of claim 14 wherein a length of the spout zones on the first tray is the same as a length of the bubble promoters on the tray below, or a width of the spout zones on the first tray is the same as a width of the bubble promoters on the tray below, or both.

16. The column of claim 14 wherein the bubble promoters have an inverted V-shape with vertical ends, an inverted V-shape with at least one inclined end, a pyramid shape, or combinations thereof.

17. The column of claim 16 wherein the bubble promoters have the inverted V-shape with at least one inclined end, and wherein the inclined end is perforated.

18. The column of claim 14 wherein the downcomers on the first tray have sloped sides.

19. The column of claim 14 wherein at least one of:
   a total open area of one of the defined areas of the first tray is greater than or equal to 100% of a total open area of the bubble promoter for the one defined area on the first tray; or an open area of the deck of the first tray is in a range of 10 to 30% of a total area of the deck; or
   an open area of the bubble promoters of the first tray is in a range of 10 to 30% of a total area of the bubble promoters.

20. The column of claim 14 wherein a size of the perforations of the deck is different from a size of the perforations of the bubble promoters, or wherein a pitch of the perforations of the deck is different from a pitch of the perforations of the bubble promoters, or both.

\* \* \* \* \*